(12) United States Patent
Kerbel

(10) Patent No.: US 10,611,422 B2
(45) Date of Patent: Apr. 7, 2020

(54) SYSTEMS, METHODS AND TECHNIQUES FOR INTELLIGENT ACCESSORIES

(71) Applicant: Michael Kerbel, Miami, FL (US)

(72) Inventor: Michael Kerbel, Miami, FL (US)

( * ) Notice: Subject to any disclaimer, the term of this patent is extended or adjusted under 35 U.S.C. 154(b) by 129 days.

(21) Appl. No.: 15/807,909

(22) Filed: Nov. 9, 2017

(65) Prior Publication Data

US 2018/0127042 A1    May 10, 2018

Related U.S. Application Data

(60) Provisional application No. 62/420,040, filed on Nov. 10, 2016.

(51) Int. Cl.
*B62J 6/04* (2020.01)
*B62J 99/00* (2020.01)
*B62J 6/00* (2020.01)

(52) U.S. Cl.
CPC ............... *B62J 6/04* (2013.01); *B62J 99/00* (2013.01); *B62J 6/005* (2013.01); *B62J 2006/006* (2013.01); *B62J 2006/008* (2013.01); *B62J 2099/002* (2013.01); *B62J 2099/0006* (2013.01)

(58) Field of Classification Search
CPC .................................... B62J 6/04; B62J 99/00
USPC .............................................. 701/36
See application file for complete search history.

(56) References Cited

U.S. PATENT DOCUMENTS

2013/0313976 A1* 11/2013 Lin .................... H05B 33/0854
                                                     315/152
2015/0163881 A1*  6/2015 Pederson ........... H05B 33/0863
                                                     315/154
2016/0302284 A1* 10/2016 Herman ............. H05B 37/0218

* cited by examiner

*Primary Examiner* — Thomas G Black
*Assistant Examiner* — Luat T Hyunh
(74) *Attorney, Agent, or Firm* — Nixon & Vanderhye PC

(57) ABSTRACT

Systems, methods and techniques for vehicle accessories leveraging sensor(s) of a portable electronic device. The method of leveraging sensor(s) of a portable electronic device to enhance capabilities of an accessory comprising sensing parameters of a vehicle or its surrounding environment by one or more sensor(s) of the portable electronic device, determining a change in condition of the vehicle or its surrounding environment, generating a command or signal depending on the detected condition change, transmitting the generated command or signal to the accessory, and controlling the accessory to change its behavior or perform a predetermined process in accordance with the received signal or command.

19 Claims, 16 Drawing Sheets

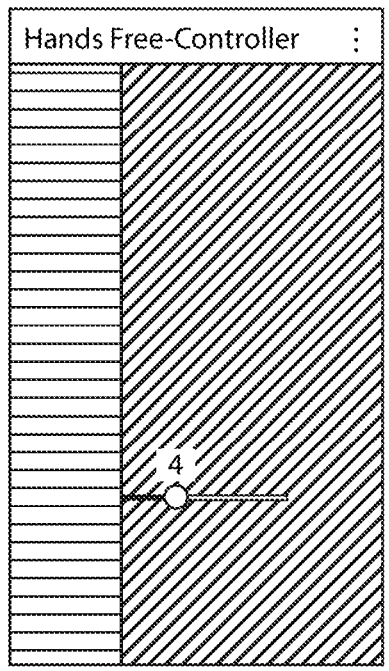
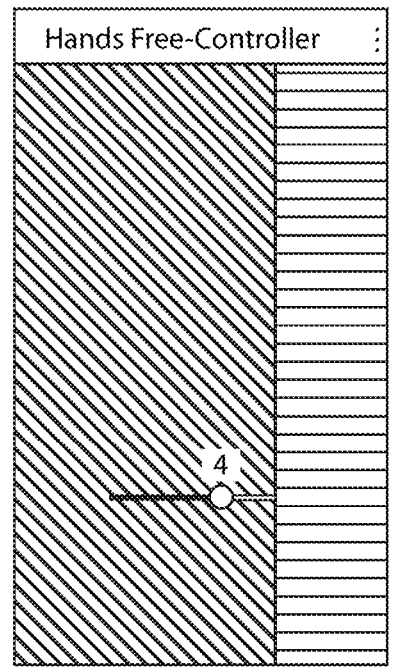
FIGURE 4A  FIGURE 4B
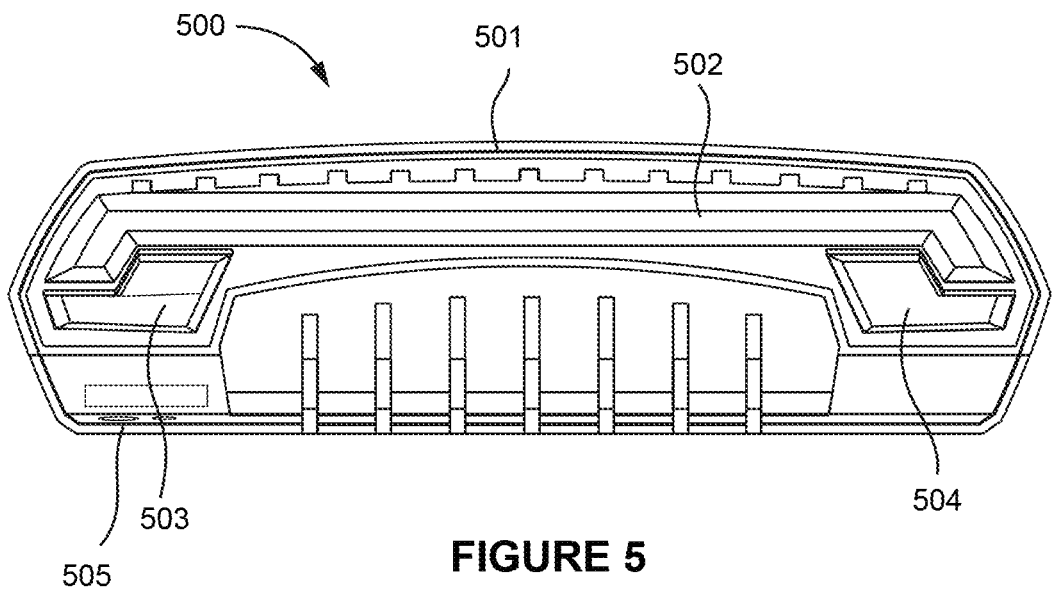
FIGURE 5

SYSTEMS, METHODS AND TECHNIQUES FOR INTELLIGENT ACCESSORIES

CROSS REFERENCE TO RELATED APPLICATION

This application claims the benefit of Provisional Application No. 62/420,040 filed on Nov. 10, 2016.

FIELD OF THE DISCLOSURE

Example embodiments disclosed herein relate generally to intelligent accessories, and more particularly to systems, methods and techniques for intelligent vehicle accessories leveraging sensor(s) associated with portable electronic devices.

BACKGROUND AND SUMMARY

Users of certain vehicles, such as bicycles, motorcycles or scooters, are vulnerable groups of road users. The small size of these vehicles compared to other vehicles, especially from the front or rear of these vehicles, makes it harder for other road users to notice them. Accidents that involve these vehicles are often due to lack of visibility of the vehicles or misjudgment of the distance to the vehicles. As a result, there exists a demand among users of these vehicles for front lights, rear lights and brake lights to alert other road users of the presence of these vehicles, particularly during high risk maneuvers, for example, when these vehicles are braking, slowing down or changing direction. Federal and state laws normally allow for front lights, rear lights and brake lights for motorcycles or bicycles, although in many states constant blinking lights are not allowed.

Light units for vehicles like motorcycles or bicycles normally have an incandescent bulb, or more commonly an array of Light-emitting diodes (LEDs), typically with white or red LEDs. It is also known to provide control circuitry to cause LEDs to flash at a predetermined rate. Flashing LEDs are often preferred as being more efficient in energy saving and more effective at attracting the attention of other road users as compared to light units with continuous illumination. In some cases, riders use a RF remote control to activate or deactivate lighting units. However, a problem with existing bicycle or motorcycle light units is that they do not indicate to viewer that the vehicles are decelerating, braking or changing direction by providing variations in illumination. Thus, more intelligent lighting systems are needed to provide better visibility for vehicles like motorcycles, bicycles or scooters during certain high risk maneuvers.

The solutions that are currently available for such intelligent lighting require a sensor enclosed in a light unit itself, or a sensor attached to wheels or a braking system to detect either deceleration, the depression of the brake lever, or other changes in the braking system like movements of a cable or brake pad. These lighting systems can be complex and cumbersome to develop and install. When a sensor for a light unit is placed remotely from the light unit itself, it requires wires to connect it to the light unit. However, a lighting system with wirings between a light and an external sensor is complex. This makes the lighting system unreliable, and hard to be removed or transferred from vehicle to vehicle. When a sensor is enclosed in a light unit itself, it will make the light unit hard or almost impossible to be upgraded, such as adding additional sensors or functionalities. Moreover, existing intelligent lighting units on vehicles like motorcycles or bicycles are relatively expensive, considering the separate sensors enclosed in the light units or mounted on these vehicles.

To solve the above identified technical problems, example embodiments of the present invention leverage sensor(s) provided for a portable electronic device, such as a smartphone, a personal digital assistant (PAD), or any other handheld or wearable devices, to enrich and upgrade the functionalities of a vehicle accessory like a lighting system. Through leveraging the sensors of a portable electronic device, an accessory may not need to use separate sensors to sense the condition changes of a vehicle or its surrounding environment. Particularly, some example embodiments of the invention allow motorcycle or bicycle riders to enhance the visibility of their vehicles, by triggering lights in response to relevant data sensed by sensor(s) of portable electronic devices.

Moreover, most handheld or wearable devices, such as smartphones, PADs or Apple watches, are also equipped with Internet, Wi-Fi, Bluetooth, or other communication capabilities, so that communications between these devices and accessories can easily be enabled as well. By virtue of the various short range communication capabilities of a portable electronic device, although a sensor of the device is placed some distance from an accessory, wired connections may not be required to enable communications between the sensor and the accessory.

By leveraging sensors and communication capabilities provided for a portable electronic device, a vehicle accessory can be easily developed and installed. The accessory is reliable and can be easily removed or transferred from vehicle to vehicle. Considering the sensor(s) and the communication module are provided by the portable electronic devices, the intelligent accessory may be relatively inexpensive.

Further, certain example embodiments of the invention increase the visibility of vehicles like motorcycles or bicycles while still complying with state and federal laws, and doing so in an easy, natural and even automatic way.

Some example embodiments are directed to a lighting system for a vehicle. The lighting system comprises a portable electronic device and a lighting accessory. The portable electronic device includes one or more sensors configured to sense parameters of the vehicle and/or surrounding environment; and a processing system including at least one processor. The processing system is configured to at least determine whether a predetermined condition change of the vehicle and/or surrounding environment is detected by the one or more sensors; in response to the detection of the predetermined condition change, generate a signal controlling the lighting accessory to modify illumination and/or perform a predetermined process; and transmit the generated signal to the lighting accessory. In certain example embodiments, the predetermined condition change includes decelerating, braking, accelerating, turning, or proximity to another object of the vehicle, or a change in sound level, light level, temperature, location, and/or gravity of the surrounding environment.

It is envisioned that the lighting accessory in one example embodiment includes a communication module; one or more lighting elements; and one or more processors. The one or more processors are configured to at least receive the generated signal from the portable electronic device via the communication module, and modify illumination of at least one of the one or more lighting elements and/or perform the predetermined process according to the received signal. Further, the lighting accessory may be attachable to a vehicle or the rider.

In an example embodiment, the one or more lighting elements of the lighting accessory include a main light, a braking light, a laser light, a left turning light, and/or a right turning light. For example, the main light includes a red light, and the left turning light and the right turning light include a yellow light.

In some example embodiments, the predetermined process includes blinking at least one of the one or more lighting elements, making a sound, and/or raising an alarm, for a predetermined time period, and the modifying illumination includes turning off, turning on, and/or flashing the at least one of the one or more lighting elements. For example, a laser light may be configured to emit laser light(s) to mark the road in close proximity to the vehicle when a predetermined dark level is reached.

In another example embodiment, the lighting accessory receives the signal from the portable electronic device via Internet, Bluetooth, Wi-Fi, cellular, or NFC.

In yet another example embodiment, the processing system of the portable electronic device is further configured to display a user interface to enable a user to configure the modification of the illumination and/or the performance of the predetermined process, and/or display another user interface enabling a user to review or change a status or mode of at least one of the one or more lighting elements.

Some example embodiments are directed to a method of leveraging sensors of a portable electronic device to enhance the functionality of a light accessory including one or more lighting elements. The method comprises detecting condition changes of a vehicle and/or surrounding environment by one or more sensors of the electronic device; determining whether a predetermined condition change of the vehicle and/or surrounding environment is detected; in response to the detection of the predetermined condition change, generating a signal controlling the lighting accessory to modify illumination of one or more lighting elements and/or perform a predetermined process; and transmitting the generated signal to the lighting accessory.

In an example embodiment, the predetermined condition change includes decelerating, braking, accelerating, turning, or proximity to another object of the vehicle, or a change in sound level, light level, temperature, location, and/or gravity of the surrounding environment.

In another example embodiment, the predetermined process comprises blinking the at least one of the one or more lighting elements, making a sound, and/or raising an alarm, for a predetermined time period.

In yet another example embodiment, the modifying illumination comprises turning off, turning on, and/or flashing the at least one of the one or more lighting elements.

In certain example embodiments, the method may further comprise displaying a user interface to enable a user to configure the modification of the illumination and/or the performance of the predetermined process, and/or displaying a user interface enabling a user to review or change a status or mode of at least one of the one or more lighting elements.

Some example embodiments are directed to a non-transitory computer-readable storage medium, having computer-executable instructions embodied thereon, wherein, upon executed by one or more processors of an electronic device, the computer-executable instructions cause the one or more processors to detect condition changes of a vehicle and/or surrounding environment by one or more sensors of the electronic device; determine whether a predetermined condition change of the vehicle and/or surrounding environment is detected; in response to the detection of the predetermined condition change, generate a signal controlling a lighting accessory to modify illumination of one or more lighting elements and/or perform a predetermined process; and transmit the generated signal to the lighting accessory.

In an example embodiment, the computer-executable instructions further cause the one or more processors to display a user interface to enable a user to configure the modification of the illumination and/or the performance of the predetermined process.

In another example embodiment, the computer-executable instructions further cause the one or more processors to display a user interface enabling a user to review or change a status or mode of at least one of the one or more lighting elements.

The exemplary embodiments, aspects, and advantages disclosed herein may be provided in any suitable combination or sub-combination to achieve yet further exemplary embodiments.

BRIEF DESCRIPTION OF THE DRAWINGS

The accompanying drawings facilitate an understanding of e various preferred embodiments of this invention. In such drawings:

FIGS. 4A and 4B illustrate example screens displayed by a software application on a portable electronic device to illustrate parameters sensed by device sensor(s) of the portable electronic device.

FIG. 5 illustrates a non-limiting example light unit.

DETAILED DESCRIPTION OF EXEMPLARY EMBODIMENTS

In accordance with certain exemplary embodiments, certain systems, device, processes and methods are disclosed for intelligent accessories for vehicles, more particularly, certain exemplary embodiments relating to vehicle accessories leveraging sensor(s) of a portable electronic device are described herein. In the following description, for purpose of explanation, numerous specific details are set forth to provide a thorough understanding of the exemplary embodiments. It will be evident, however, to a person skilled in the art that the exemplary embodiments may be practiced without these specific details.

Figure 1:
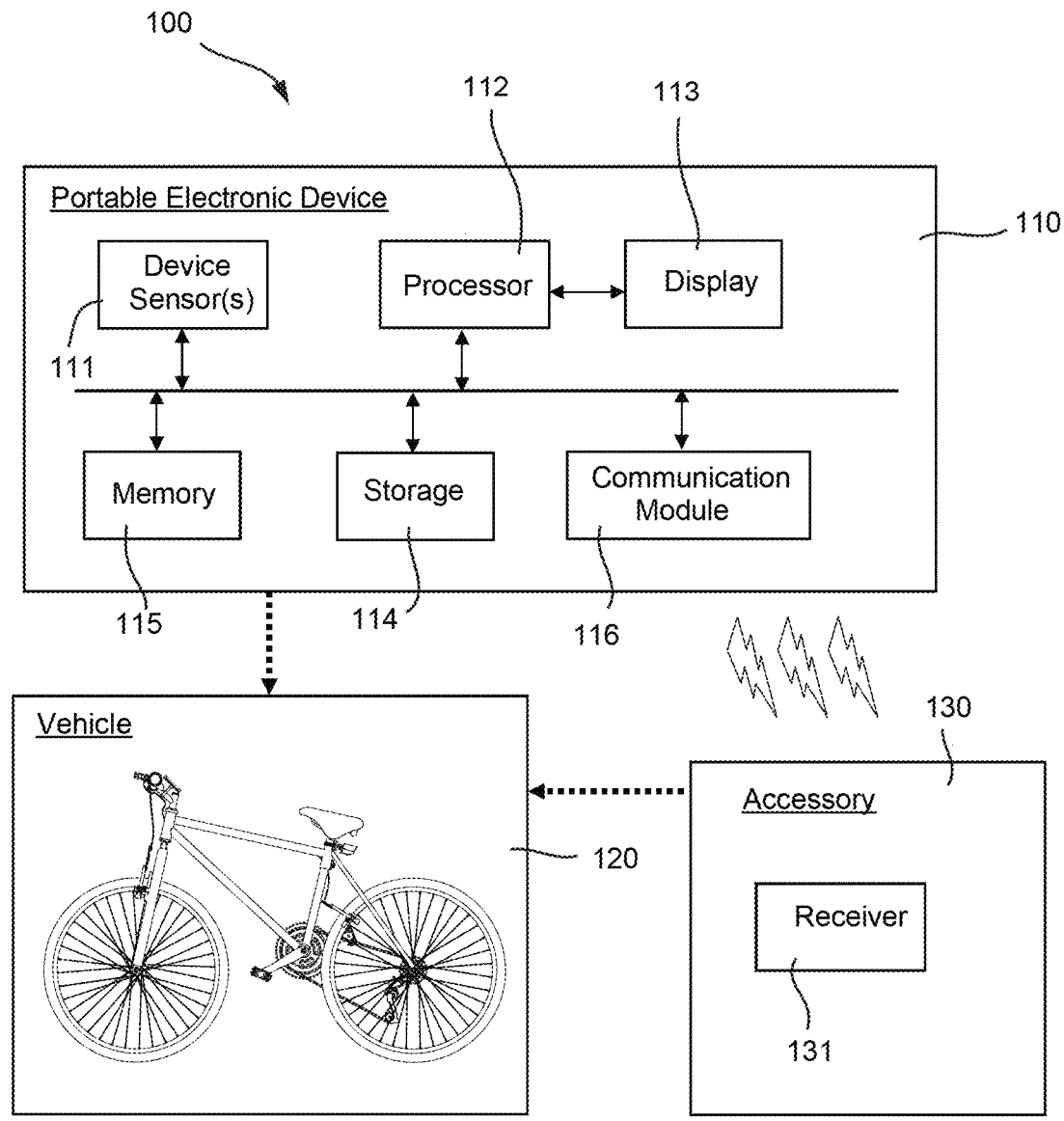
FIG. 1 shows a system architecture of a non-limiting example accessory leveraging sensors of a portable electronic device.

FIG. 1 illustrates a system architecture 100 of a non-limiting example accessory leveraging sensor(s) of a portable electronic device described herein. Some example embodiments may have different and/or other sub-modules than the ones described herein. Similarly, the functions can be distributed among the sub-modules in accordance with other embodiments in a different manner than is described herein.

The system architecture 100 includes a portable electronic device 110, a vehicle 120 and an accessory 130 for the vehicle 120. The accessory 130 leverages one or more device sensor(s) 111 of the portable electronic device 110 to enrich or upgrade its capabilities.

The vehicle 120 may be a thing used for transporting people or goods, especially on land or in water, such as a bicycle, a motorcycle, a scooter, a baby stroller walker, a wheel chair, or a boat, or a thing used by people while moving, such as a cane, a pole, or the like.

The accessory 130 can be any kind of accessories for the vehicle 120. It is a hardware self-contained unit that is powered by battery or gets its power supply from an external source. In an example embodiment, the accessory 130 is an intelligent light unit for a vehicle to indicate its presence or movements to other vehicles, or assist users of the vehicle in dark or dim environments. In certain example embodiments, LEDs may be used as a part of a light unit to be affixed to the external body of a vehicle, so that the light unit visually warns drivers of proximate vehicles, thereby increasing the safety for occupants or others in close proximity of the vehicle. The light unit may also provide control circuitry to cause the LEDs to flash at a predetermined rate.

In an example embodiment, the accessory 130 is affixed to a component of the vehicle 120, such as being attached or mounted to a seat post. The accessory 130 can be mobile or stationary, and it can be near-by (e.g., via Bluetooth technologies) or across continents (e.g., via cellular technologies) as to the vehicle 120. In other example embodiments, the accessory 130 may not be affixed to the vehicle 120. Instead, it can also be associated with a rider or a passenger of the vehicle 120. For example, a lighting unit attached to a cup, a vest or a backpack of a cyclist may dearly indicate the presence and movements of the cyclist.

The portable electronic device 110 can be any kind of portable device, such as a smartphone, a PAD, a laptop, a tablet computer, or any other handheld devices or wearable devices. The portable electronic device 110 comprises a processor 112, a display 113, a memory 115, and a storage 114. It may use a mobile operating system, such as Google's Android OS, Apple's iOS, Nokia's Symbian OS, Blackberry's BlackBerry OS, Samsung's Bada, Microsoft's Windows Phone, or Hewlett-Packard's webOS, etc.

The portable electronic device 110 is equipped with one or more device sensor(s) 111. Normally portable electronic devices have multiple sensors that provide data input to their various systems or applications, including one or more motion sensors (e.g., an accelerometer, a gyroscope, an inertial motion sensor, a compass and/or a magnetometer), an imaging sensor (e.g., camera), a proximity sensor, an ambient light sensor, a sound level sensor and/or a positioning sensor (via the Global Positioning System). For example, Apple Inc.'s iPhone 7 smartphone includes a touch ID fingerprint sensor, a barometer, a three-axis gyro, an accelerometer, a proximity sensor, and an ambient light sensor. In particular, a three-axis gyro may sense the orientation of a device and changes the screen of the device accordingly, enabling a user to easily switch between portrait and landscape orientations. An ambient light sensor approximates human eye response to light intensity under a variety of lighting conditions and then adjusts the display brightness of a device which in turn saves battery power.

In addition, other kinds of sensors can also be enclosed in a portable electronic device, including a gravity sensor, a linear acceleration sensor, a temperature sensor, a humidity sensor, an altitude sensor, a rotation vector sensor, an orientation sensor, and/or a step counter. For example, a humidity sensor may turn on an irrigation system upon sensing a change of humidity (e.g., from 50% to 100%). The portable electronic device 110 may be equipped with any other kinds of sensors to detect certain changes of the device or surrounding environments. The device sensors of a portable electronic device allow the development of new applications which, through processing of sensor data, control various kinds of accessories.

Importantly, the portable electronic device 110 also comprises a communication module 116 to provide communication capabilities to the device, including the capability of transmitting information to the accessory 130. The enabled communications can be via many different technologies including Internet, Bluetooth, cellular (e.g., GSM 4G LTE), Wi-Fi, or NFC, IR, Zigbee, etc. On the other hand, the accessory 130 also has a receiver 131 configured to receive signals or commands from the portable electronic device 110. The portable electronic device 110 transmits information to the accessory 130 through either a wired or wireless connection, including but not limited to Internet, Bluetooth, Wi-Fi, or NFC, cellular (e.g., GSM 4G LTE), or the like. For example, the receiver 131 of the accessory 130 may be a built-in Bluetooth low energy receiver with multiple channels.

In an example embodiment, the portable electronic device 110 is attached or mounted to a bicycle handle bar. In other example embodiments, the portable electronic device 110 may be attached to any part of the vehicle 120, depending on the functionalities of the accessory 130 and the convenience of the vehicle rider. Alternatively, the portable electronic device 110 may also be associated with a vehicle rider or a passenger, such as in a pocket of the rider or passenger, or being attached to a backpack, a cup, or a vest of the driver or passenger.

In certain example embodiments of the present invention, both the portable electronic device 110 and the accessory 130 are attached to or associated with the vehicle 120 in certain ways, in order to leverage the device sensors 111 of the portable electronic device 110 to enrich or upgrade the capabilities of the accessory 130. By using the device sensors 111 of the portable electronic device 110, it is possible to monitor and determine a condition change of the vehicle 120, including decelerating, braking, accelerating or turning of the vehicle, or the proximity of the vehicle to another object, or a change in the surrounding environment of the vehicle 120, including a change in sound level, light level, temperature, proximity, position, or gravity. In response to a particular condition change, the accessory 130 may modify its operation or perform a predetermined process accordingly.

Figure 2:
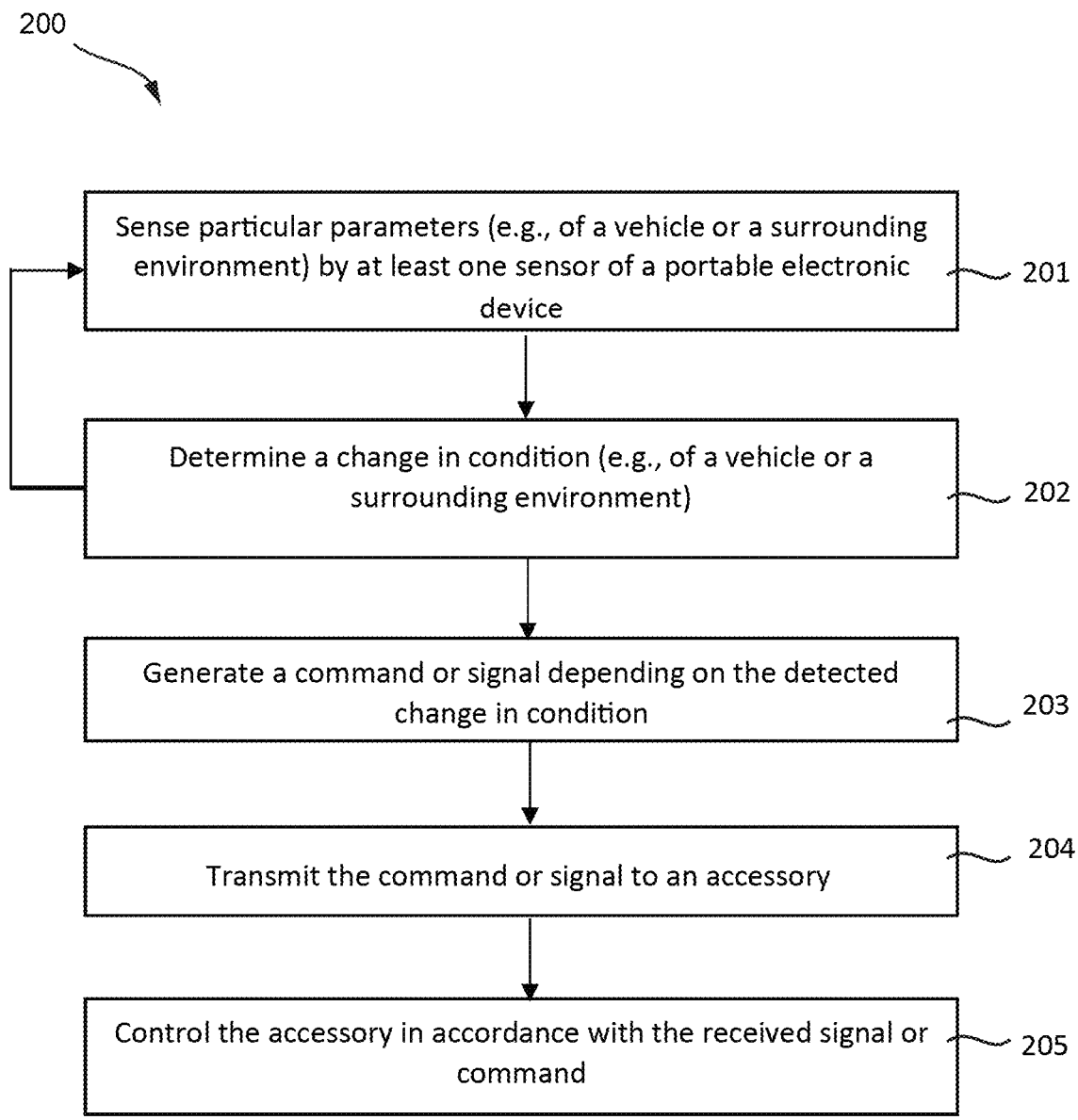
FIG. 2 shows a workflow of a non-limiting example accessory leveraging sensor(s) of a portable electronic device.

FIG. 2 shows an example workflow 200 of a non-limiting example accessory leveraging sensor(s) of a portable electronic device.

In step 201, at least one sensor of the portable electronic device senses certain parameters of a vehicle or its surrounding environment. Various sensors are used to sense different parameters based on pre-programmed algorithms developed in an application installed on the portable electronic device. A gyroscope senses an orientation change of the portable electronic device or vehicle. A linear acceleration sensor measures the accelerations operating on the device excluding the gravity. An ambient light sensor approximates human eye response to light intensity under a variety of lighting conditions. A proximity sensor senses whether there is anything in close proximity of the device. The application may be executed in the background of the portable electronic device and user interfaces are not required.

In step 202, the parameters sensed by the sensor are monitored and processed to detect a predetermined condition change of the vehicle and its surrounding environment. The condition change includes a movement change of the vehicle, such as decelerating, braking, accelerating or turning, a change in the vehicle's proximity to another object, or an environmental change, such as a change in sound level, light level, temperature, proximity, position, or gravity, etc. Once the vehicle starts, the steps 201 and 202 may be repeatedly performed to monitor the vehicle and its environment and to determine any desired condition changes in real time.

Whenever a particular condition change is determined, in step 203, a corresponding signal or command will be generated in accordance with the detected condition change. The particular condition may be significant for a particular goal or for a particular application. In step 204, the generated signal or command is transmitted to an accessory, via a wired or wireless connection, including but not limited to Internet, Bluetooth, Wi-Fi, or NFC, cellular (e.g., GSM 4G LTE), etc. The command or signal is sent to the accessory based on given APIs that the accessory knows how to translate.

In step 205, in accordance with the received signal or command, the accessory is controlled to modify its operation or perform a particular process, such as blinking a light, performing certain movements, making a sound, or raising an alarm. Various behaviors may be performed in response to different environmental changes. For example, a safety light may be turned on in response to a change from daytime to nighttime. An irrigation system may be turned off in response to an increase of humidity, for example, from 50% to 100%. A brake light may be displayed in response to a change in the speed of a vehicle to indicate the slowing down of the vehicle. A light may start to blink in response to a change detected by an accelerometer to show rapid decelerating. A light may start to blink in response to a change in sound level to indicate the close proximity of a vehicle. In an example embodiment, the accessory is a light unit for a vehicle, and, as described in detail below with reference to FIG. 3, the light unit varies in illumination depending on the received signals or commands.

Accordingly, the accessory relies on sensor(s) of the portable electronic device to perform certain intelligent functionalities. In this way, the accessory itself does not need to be equipped with a sensor, nor does the vehicle need to install any separate sensors in order to support more intelligent functionalities. This will largely reduce the complexity in developing and installing a vehicle accessory. Further, by using sensors provided for a portable electronic device, an intelligent accessory may be less expensive compared to other accessories with analogous functionalities. Future upgrades to a lighting system can include other functionalities that rely on new sensors provided by a portable electronic device. As a result, additional new features may be automatically upgraded, e.g., via cloud, to existing users of an intelligent light system. In this way, functionalities of an intelligent light system can keep on getting upgraded for its existing users.

Non-limiting example embodiments of the invention, including a Bicycle Lighting System and a Motorcycle Lighting system, will be described in detail below with reference to FIGS. 3A-9 and 15-18 and FIGS. 10A-18 respectively.

I. A Bicycle Lighting System—Hands Free Bicycle Lights

Figure 3A:
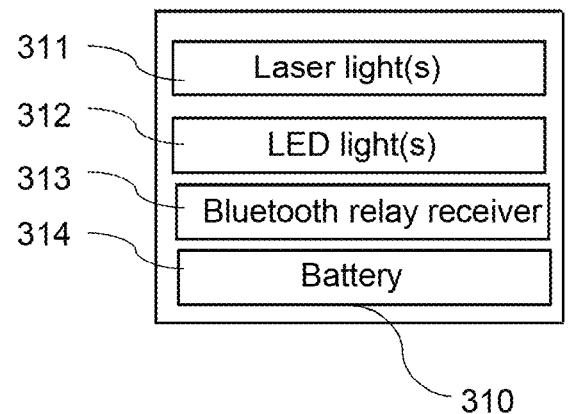
FIG. 3A illustrates a non-limiting example light unit installed on a bicycle.
Figure 3B:
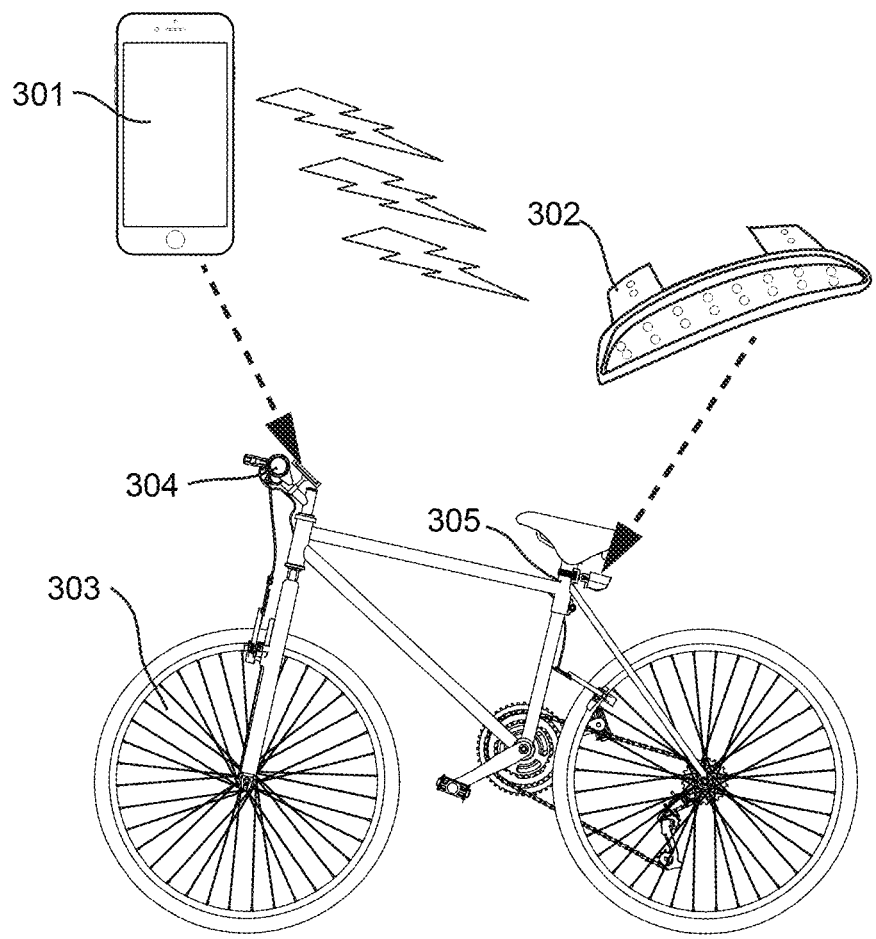
FIG. 3B illustrates a non-limiting example bicycle lighting system.

FIGS. 3A and 3B illustrate a non-limiting example bicycle lighting system 300 comprising a light unit 302 for a bicycle 303. In some example embodiments, as illustrated in a block diagram 310 in FIG. 3A, the light unit 302 includes one or more LED light(s) 312, one or more laser light(s) 311, a battery 314, and communication circuit, such as a Bluetooth relay receiver 313. The light unit 302 may also include one or more processors, and/or a non-transitory computer-readable storage medium with computer-executable instructions embodied thereon. In these example embodiments, the lights 311-312, the battery 314 and the Bluetooth relay receiver 313 are connected by wires. Alternatively, the light unit 302 may also get its power supply from an external source. The bicycle lighting system 300 leverages sensors of a portable electronic device 301 to enhance the capabilities of the light unit 302.

Figure 8A:
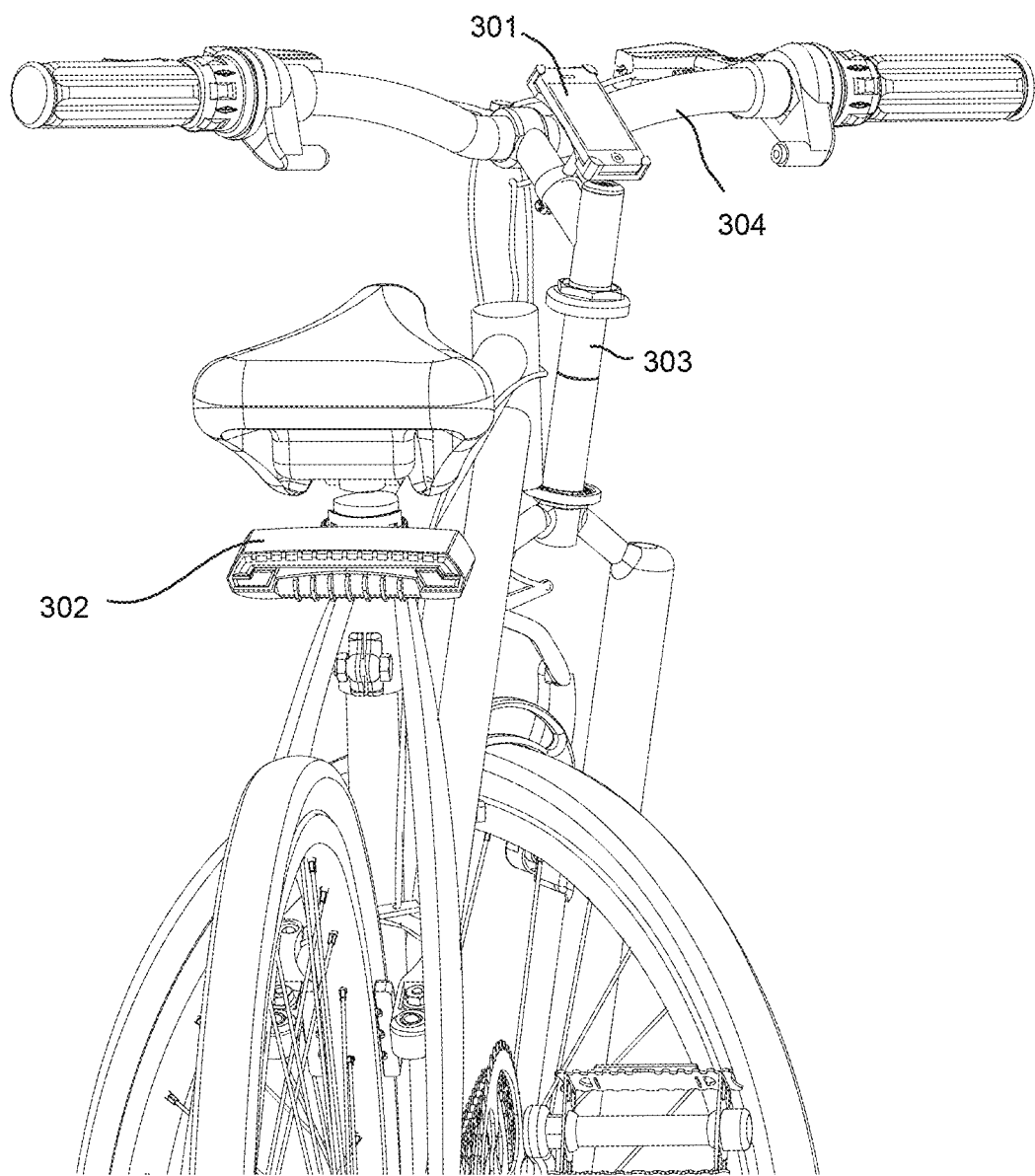
FIG. 8A illustrates a non-limiting example bicycle lighting system, in which a light unit and a smartphone are attached to a bicycle.

In an example embodiment, as shown in FIG. 8A, the portable electronic device 301 is attached to a handle bar 304 of the bicycle 303, and the light unit 302 is attached to a seat post 305 of the bicycle 303. Wires or other kinds of physical connections may or may not be needed to enable the data transmission from the portable electronic device 301 to the light unit 302.

In certain example embodiments, the portable electronic device 301 includes an accelerometer, a gyroscope, a proximity sensor, and/or a light/darkness sensor. In other example embodiments, the portable electronic device 301 may include any other sensors, such as a GPS, a compass, a gravity sensor, a temperature sensor, or the like.

In an example embodiment, upon a swirl or a quick movement of the handle bar 304 (e.g., to the left or right) and then a movement of moving back to a straight position by a bicycle rider, the motion is automatically determined by the accelerometer of the portable electronic device 301. For example, FIGS. 4A and 4B illustrate example screens displayed by a software application executed on a portable electronic device to show parameters sensed by device sensor(s). In particular, when the rider swirls to the left, the accelerometer senses the movement (as shown in FIG. 4A), and when the rider swirls to the right, the accelerometer senses the movement as well (as shown in FIG. 4B).

After that, a corresponding signal or command will be generated and transmitted to the light unit 302 via a short range communication mechanism, for example, a wired or wireless connection like Bluetooth, Wi-Fi, IR, Zigbee, or near field communication (NFC). As a result, the light unit's yellow turning light starts to blink and may continue blinking for a period of time, thereby facilitating the bicycle riding. The blinking time period is preset and adjustable by the bicycle rider. As some state laws prohibit continually blinking light for a period longer than a permitted period, the blinking time period may be re-configured to make it comply with relevant laws.

In another example embodiment, when the bicycle rider is ready to stop, the rider will hover/cover the face of the portable electronic device 301, for example, about 6 to 10 inches away for a predetermined period of time. The proximity sensor enclosed in the portable electronic device 301 will sense the motion and a corresponding command or signal will be generated and then transmitted to the light unit 302. A red light of the light unit 302 will then blink for a given time period accordingly. The time period for the blinking is adjustable by the rider. In other example embodiments, the light unit 302 may include a light source that will blink if the bicycle decelerates or brakes, in accordance with parameters sensed by a linear acceleration sensor.

Figure 8B:
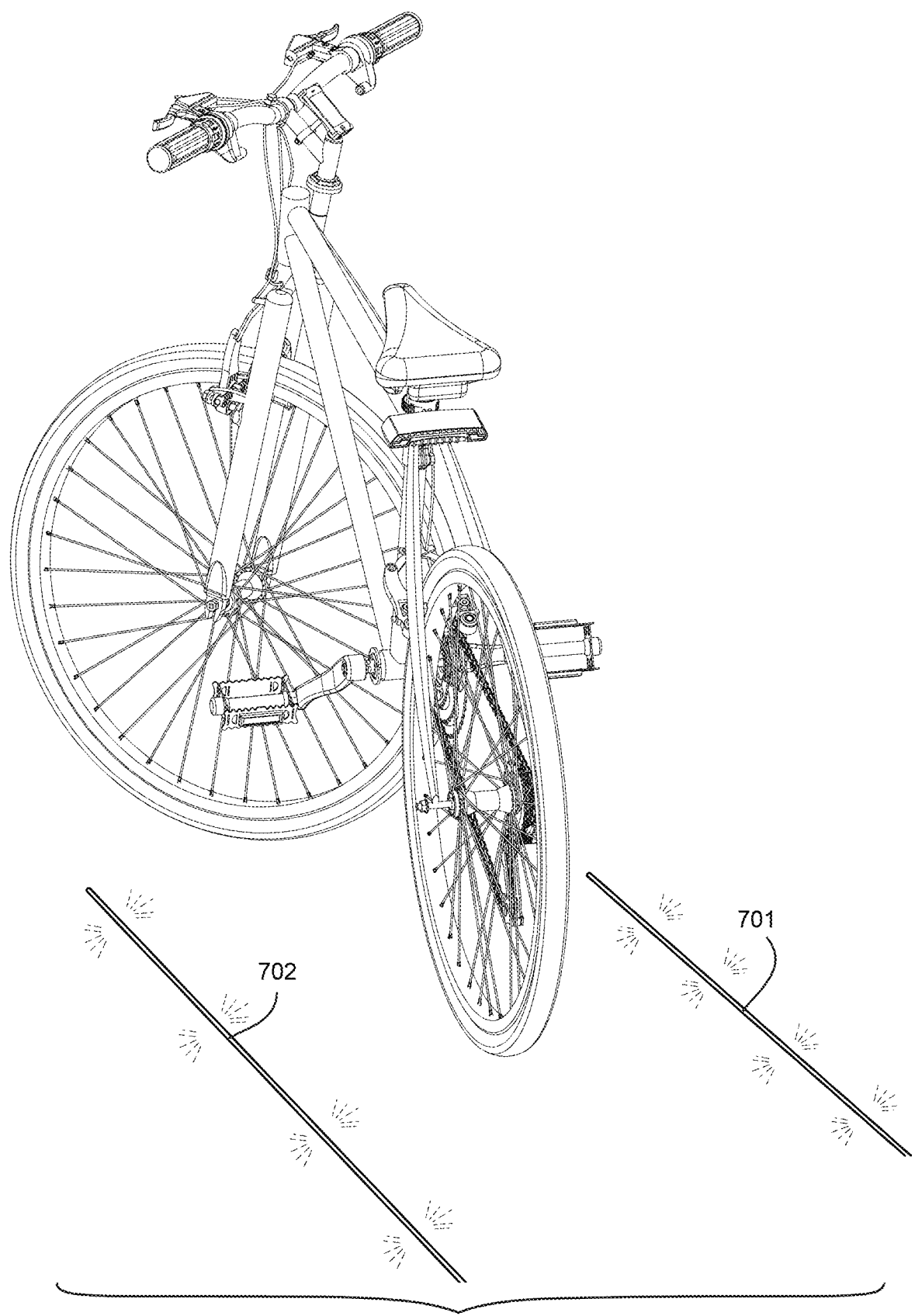
FIG. 8B shows a non-limiting example bicycle lighting system, in which one or more laser lights will be automatically turned on, when a low light environment is sensed.
Figure 9:
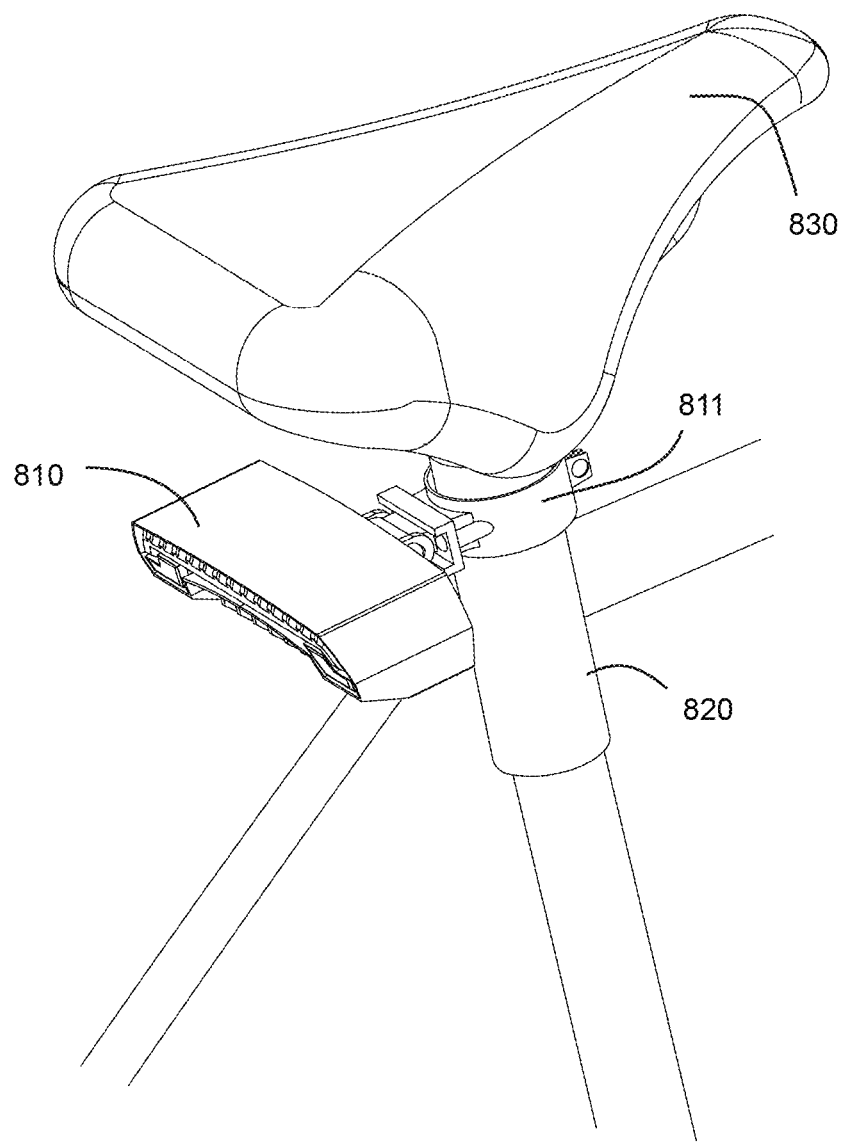
FIG. 9 shows a non-limiting example light unit installed on a bicycle.

In yet another example embodiment, the light unit 302 may include a light source that can be automatically turned on or off without any additional manual operations from the vehicle rides. For example, the light unit 302 includes a laser light, which emits laser lights to mark the road below the rider. As shown in FIG. 8B, when a low light environment is sensed, one or more laser guide line(s) 701, 702 formed by the emitted laser light(s) will be automatically turned on. The laser light will be automatically turned off at day time and will be automatically turned on at dusk or in dark places. A light/darkness sensor enclosed in the portable electronic device 301 will sense a low light environment and a signal or command will be sent to the light unit 302 to turn on or off the laser light. In this way, it increases nighttime riding safety while conserving battery power.

In some example embodiments, the light unit 302 may start to blink when a proximity sensor of the portable electronic device 301 detects a car or other vehicles are approaching or in close proximity to the bicycle 303. In an example embodiment, a light source of the light unit 302 starts to blink upon approaching a car with Hot-Spot, etc. In other example embodiments, a light source of the light unit 302 will turn on when a rider or user is 15 feet of the bicycle, to indicate the rider is connected with the bicycle 303. On the other hand, the portable electronic device 301 will notify the rider by raising an alarm, when the bicycle 303 is disconnected with the rider.

In view of the above, by virtue of the sensors and communication module of a portable electronic device, a rider may activate or deactivate turning lights, stop lights and laser lights without using a remote control or changing his/her hand grip.

FIG. 5 illustrates a non-limiting example light unit 500. The light unit 500 can be used as an accessory for any kind of vehicles, including a bicycle, a motorcycle, a scooter, a stroller, a cane, a pole, or the like.

In an example embodiment, the light unit 500 comprises a main body 501, which encloses a main light 502, a left turning light 503 and a right turning light 504. The main light 502 blinks for a given time period while the associated vehicle is braking or decelerating. The left turning light 503 or the right turning light 504 blinks for a desired time period while the vehicle is turning left or right. In the example embodiment, the main light 502 includes a red light, and both left turning light 503 and the right turning light 504 include a yellow light. Alternatively, these lights may include a light of any other color(s). In certain example embodiment, the light unit may further include an "ON/OFF" button on a side, and the "ON/OFF" button is configured to enable a user to manually turn on or turn off the main light by pressing the button.

In alternative example embodiments, the main light 502, left turning light 503 and right turning light 504 might be combined in different manners. For example, the left turning light 503 and the right turning light 504 may be combined to one light that shows different marks, emits different lights or emits lights in different manners, for left and right turns. Alternatively, the main light 502, the left turning light 503 and the right turning light 504 may be combined into one light that emits various kinds of lighting patterns to indicate different movements.

In addition, the light unit 500 also comprises a laser light 505 that emits laser light(s) to mark the road below the rider, in front of the rider, or anywhere in close proximity to the rider, while the associated vehicle is in a dim or dark environment. In some example embodiments, the light unit may include more than one laser light, such as a left laser light, a front laser light, a right laser light, and a rear laser light, to mark different sides of the road below the rider.

Figure 6A:
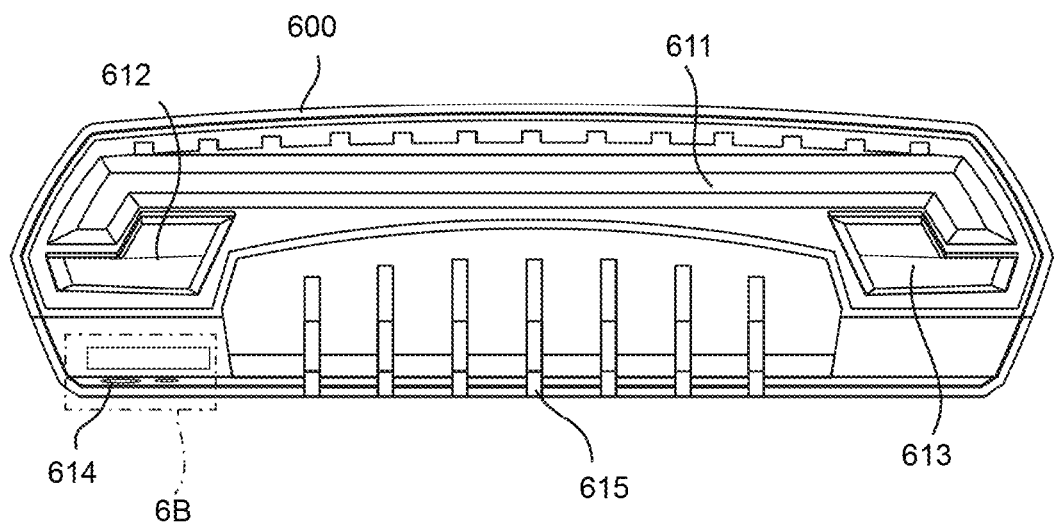
FIG. 6A illustrates various parts of a non-limiting example light unit.
Figure 6B:
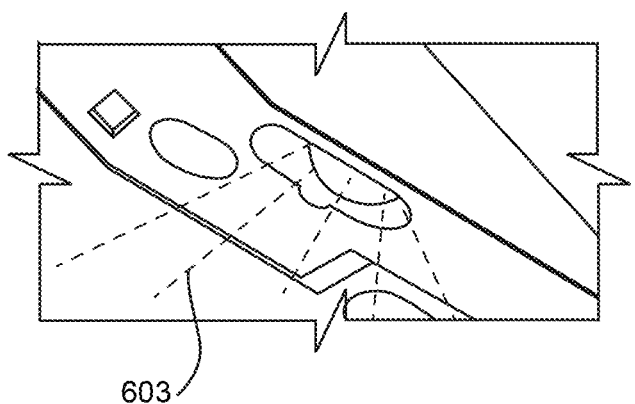
FIG. 6B illustrates a part of the example light unit shown in FIG. 6A.

FIG. 6 further illustrates an example light unit 600. The light unit 600 comprises a main light 611, a left turn light 612, a right turn light 613, and a laser light 614. In an example embodiment, a light 603 is emitted by the laser light 614, as illustrated in FIG. 6B. In certain example embodiments, the main light 611 emits a red light, the right light 613 emits a yellow light, and/or the laser light 614 emits the laser light 603 in response to particular command(s) or signal(s) received from a portable electronic device.

Figure 7:
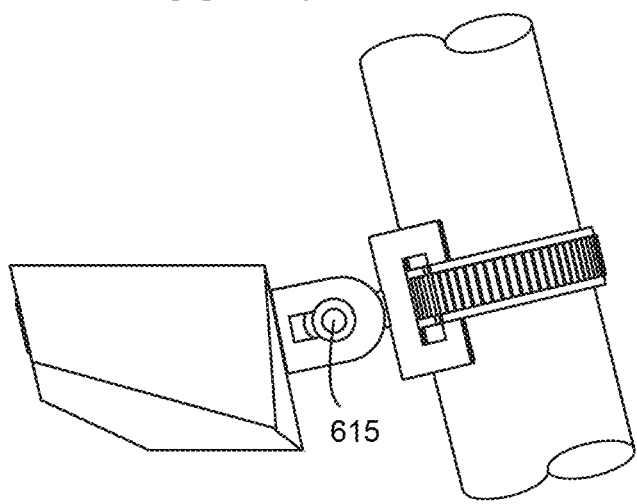
FIG. 7 illustrates a non-limiting example light unit installed on a seat post of an example bicycle.

The light unit 600 may be attached to various parts of a vehicle, such as the seat post of a bicycle. As shown in FIG. 7, the light unit 600 comprises a fast release/fixing button 615 to easily release the light unit 600 from the seat post of a vehicle or attach the light unit 600 to the vehicle. As a wired connection may not be required to enable communications between the light unit 600 and a portable electronic device, the light unit can easily be installed, removed, or transferred from vehicle to vehicle. In an example embodiment, as detailed in FIG. 9, a light unit 810 comprises a connecting assembly 811 allowing the light unit 810 to be attached to a component of a bicycle 830. In particular, the light unit 810 can be easily installed or removed from a seat post 820 of the bicycle 830. In alternative embodiments, a wired connection may instead be used to connect the light unit 600 and a portable electronic device.

Figure 15:
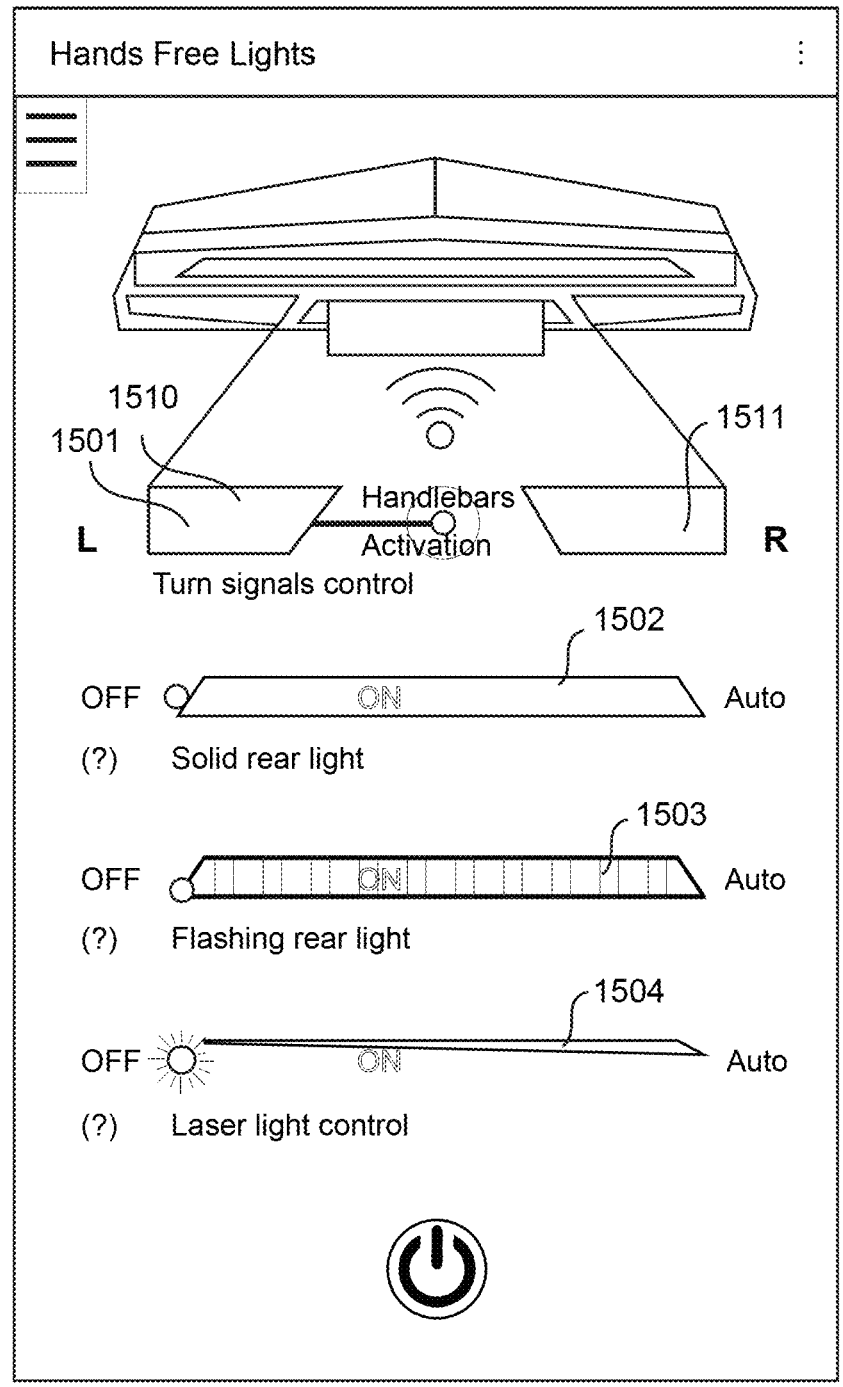
FIG. 15 shows an example screen displayed by a software application on a portable electronic device displaying a lighting status or mode of a light unit to a user.
Figure 16:
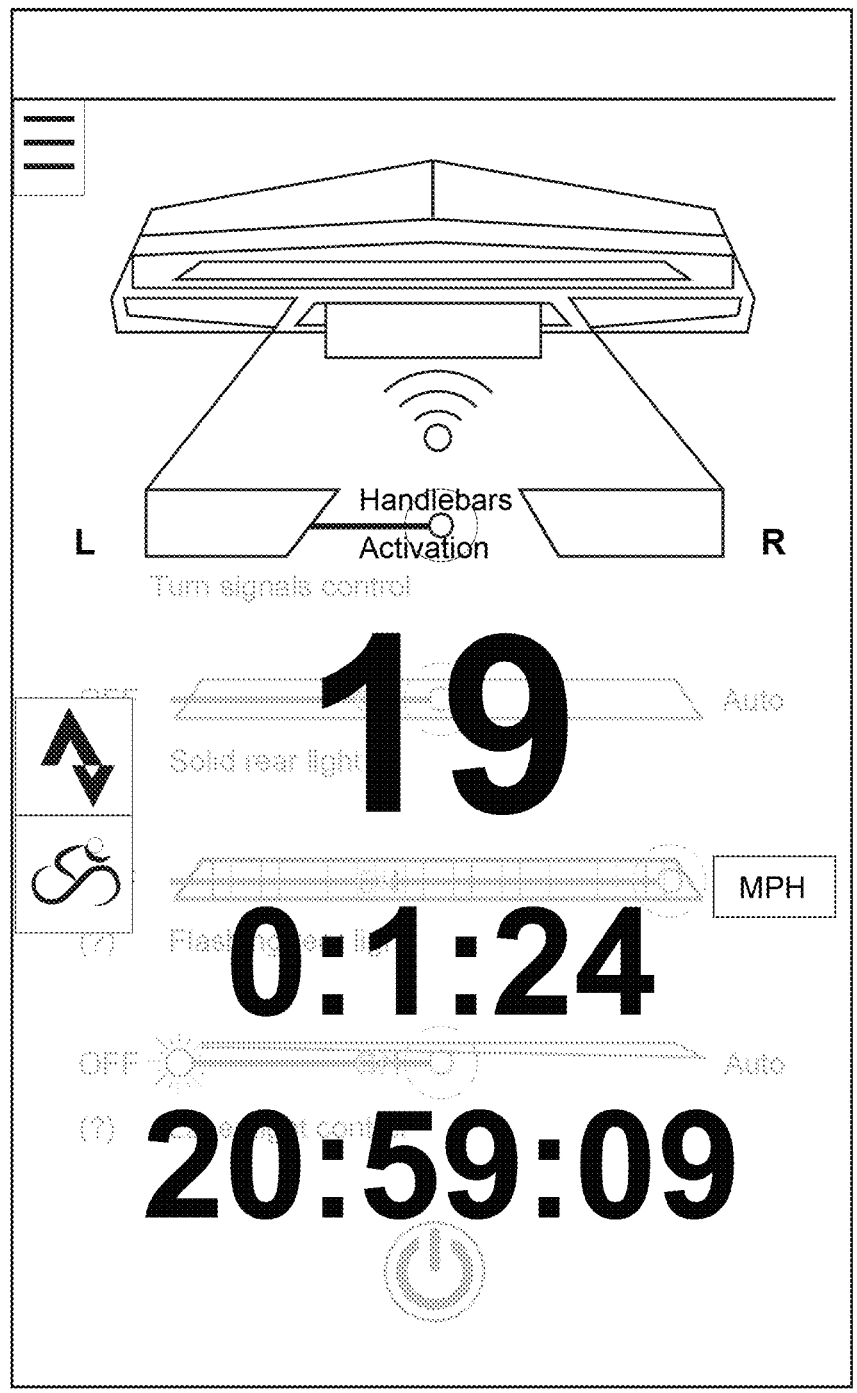
FIG. 16 shows an example screen displayed by a software application on a portable electronic device displaying a time to a user.
Figure 17:
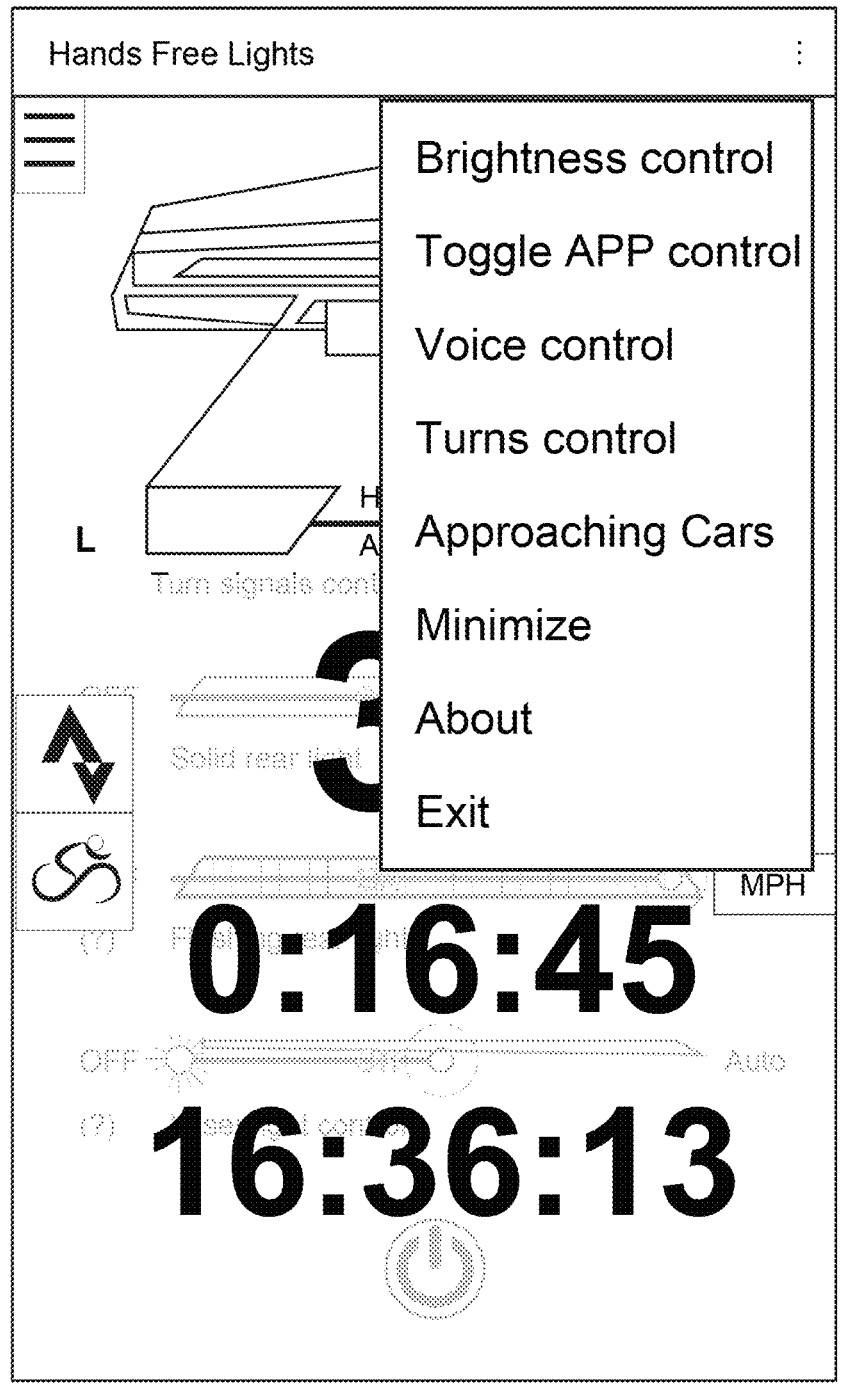
FIG. 17 shows an example screen displayed by a software application on a portable electronic device allowing a user to configure a lighting system.
Figure 18:
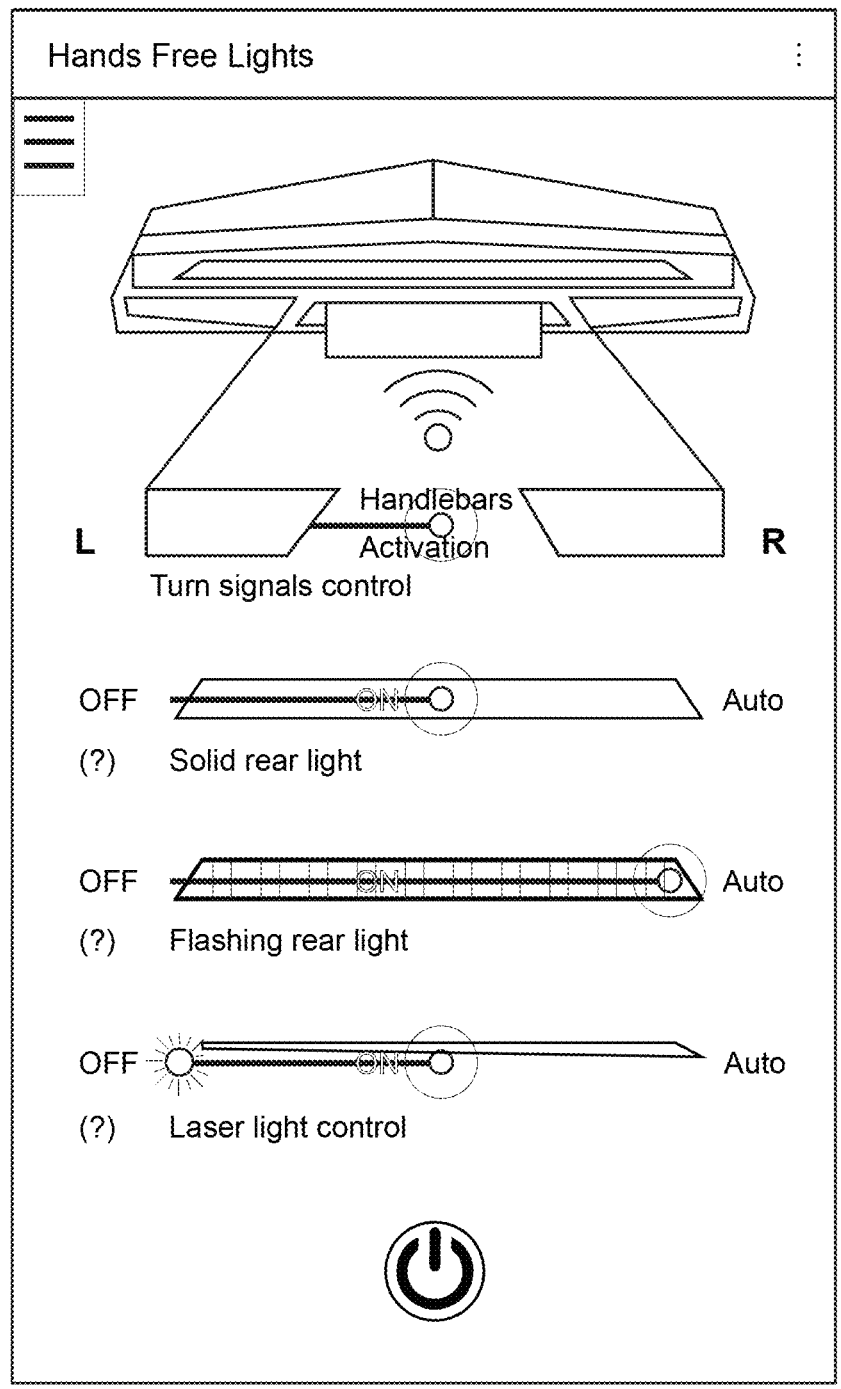
FIG. 18 shows an example screen displayed by a software application on a portable electronic device displaying a lighting status or mode of a light unit to a user.

In certain example embodiments, a software application (e.g., a Hands-Free App) may be installed and executed on the portable electronic device 301 to allow users to review data sensed by sensors, to monitor or change the status of the bicycle 303 or the light unit 302, or to configure the lighting system 300, for example, as shown in FIGS. 15-18. In particular, the software application may display the status and/or mode of lighting elements of the light unit 302 (e.g., as shown in FIGS. 15 and 18), the speed of the bicycle 303 (e.g., as shown in FIG. 16), and time on the portable electronic device 301 (e.g., as shown in FIG. 16). Moreover, the software application may allow a user to configure the status of the light unit and add functions.

FIG. 15 shows an example screen displayed by the software application on a portable electronic device to indicate a lighting status or mode of some of the lighting elements of the light unit 302. In particular, the figure shows the status and/or mode of a left turning light, a right turning light, a solid rear light, a flashing rear light, and a laser light.

Sliders 1502-1504 in FIG. 15 show the status and mode of the solid rear light, the flashing rear light and the laser light respectively. In some example embodiments, the solid rear light, the flashing light, and the laser light of the light unit 302 may be operated in three modes: OFF (e.g., as shown on the left side of the sliders 1502-1504), ON (e.g., as shown in the middle of the sliders 1502-1504), and Auto (e.g., as shown on the right side of the sliders 1502-1504). Each of these lights is turned on in the "ON" mode, and turned off in the "OFF" mode. By default, the solid rear light is operated in the "ON" mode. When the solid rear light is operated in the "Auto" mode, it is turned on at night and turned off at daytime. By default, the flashing light is operated in the "Auto" mode. For example, in the "Auto" mode, the flashing light may flash for 28 seconds when the user waves his/her hand over the face of the portable electronic device 301. By default, the laser light is operated in the "Auto" mode, in which it is turned on at night and turned off at daytime.

Further, user interfaces provided on the screen of the portable electronic device enable the user to modify the behaviors of various lighting elements of the light unit 302 as well. For example, in FIG. 15, the user may touch a right button 1511 or a left button 1510 on the top slider 1501 to activate the right turning light or the left turning light respectively. In another example embodiment, the user may touch on any of the sliders 1502-1504 to change the operating mode of the solid rear light, the flashing light, or the laser light. FIG. 18 shows another example screen provided by the software application on the portable electronic device, and it indicates a lighting status different from what is shown in FIG. 15.

The software application may also provide user interfaces to further configure a solid or flashing light, a turning signal, or laser lights, etc. As shown in FIG. 17, in an example embodiment, the software application on the portable electronic device 301 allows a user to select from: Brightness control, Toggle App control, Voice control. Turns control, Approaching cars, and minimize, etc.

In an example embodiment, the "Voice control" selection enables the user to select to activate or deactivate a voice control feature. For example, once the voice control feature is activated, an alternative way to operate turning lights is available, such as waving a hand over the face of the phone and say "Left" or "Right."

In another example embodiments, the "Turn control" selection enables the user to choose degrees needed for the handlebar movement to activate the turning lights. The user may configure his/her preferences by testing different settings.

In yet another example embodiments, the "Minimize" selection enables the user to choose to execute the software application in a minimized mode or not. When the software application is executing in the minimized mode, most functions are working in the background. Some other applications, such as a navigation app, may be displayed one the screen of the portable electronic device at the same time. Moreover, some functionalities, for example, sound commands, may not work when the software application is in a minimized mode.

FIG. 16 shows another example screen (e.g., including a dashboard) provided by a software application on a portable electronic device to display a time to a user. In an example embodiment, the rider of a vehicle may wave his/her hand over the face of the portable electronic device to show the dashboard. The dashboard may include speed and time data as well as quick access to external popular bicycle application(s). In another example embodiment, the rider may wave his/her hand again to hide the dashboard.

II. A Motorcycle Lighting System—Motorcycle Safety Light

Figure 10A:
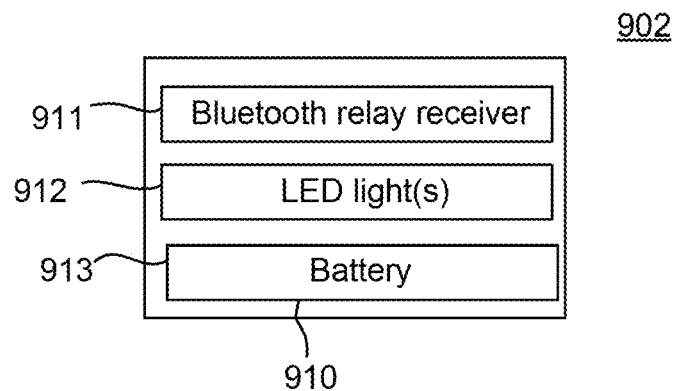
FIG. 10A illustrates a non-limiting example light unit installed on a motorcycle.
Figure 10B:
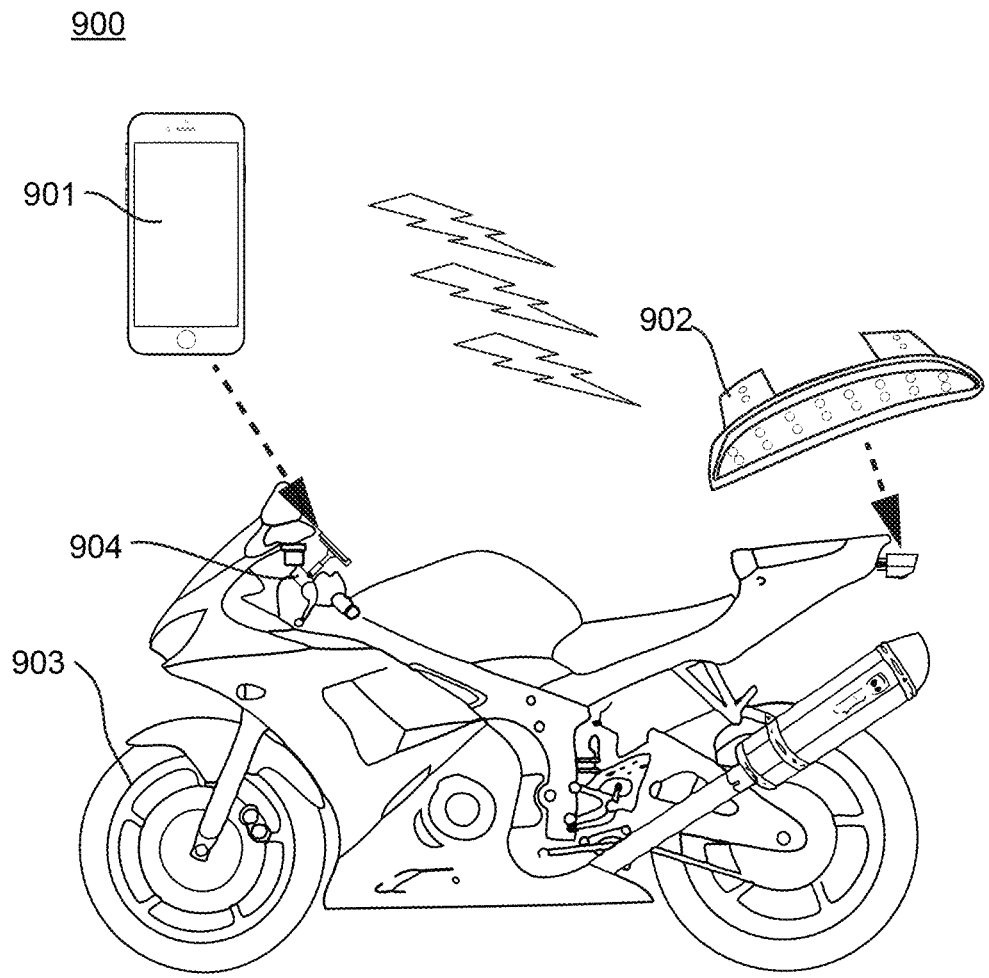
FIG. 10B illustrates a non-limiting example motorcycle lighting system.

FIGS. 10A and 10B illustrate a non-limiting example motorcycle lighting system 900, comprising a light unit 902 for a motorcycle 903. The motorcycle lighting system 900 leverages sensors of a portable electronic device 901 to enhance capabilities of the light unit 902.

In an example embodiment, the portable electronic device 901 is attached to a handle bar 904 of the motorcycle 903, and the light unit 902 is attached to the back of the motorcycle 903. Alternatively, the portable electronic device 901 or the light unit 902 may also be attached to any other parts of the vehicle or associated with a vehicle rider or passenger in any ways. Wired connections may or may not be needed to enable communications between the portable electronic device 901 and the light unit 902.

In certain example embodiments, the portable electronic device 901 includes a sound level sensor, an accelerometer, a gyroscope, a proximity sensor, and/or a light/darkness sensor. The proximity sensor may detect the proximity to a light or intersections. In other example embodiments, the portable electronic device 901 may include one or more other sensor(s), such as a GPS, a compass, a gravity sensor, a temperature sensor, a weather change sensor, etc.

In some example embodiments, as illustrated in a block diagram 910 in FIG. 10A, the light unit 902 includes one or more LED light(s) 912, a battery 913, and communication circuit, (such as a Bluetooth relay receiver 911). The light unit 902 may also include one or more processors, and/or a non-transitory computer-readable storage medium with computer-executable instructions embodied thereon. In these example embodiments, the lights 912, the battery 913 and the Bluetooth relay receiver 911 are connected by wires. Installation of the motorcycle light system 900 is simple as only 12V+ and 12V− are needed from the motorcycle 903. Alternatively, the light unit 902 may get power supplied from an external source.

Figure 13:
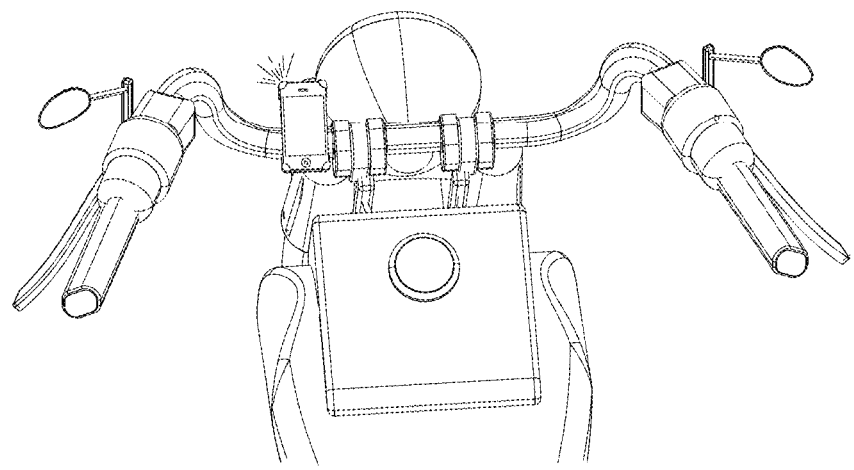
FIG. 13 shows a non-limiting example motorcycle lighting system, in which a change in sound level is detected by a sound level sensor.
Figure 14:
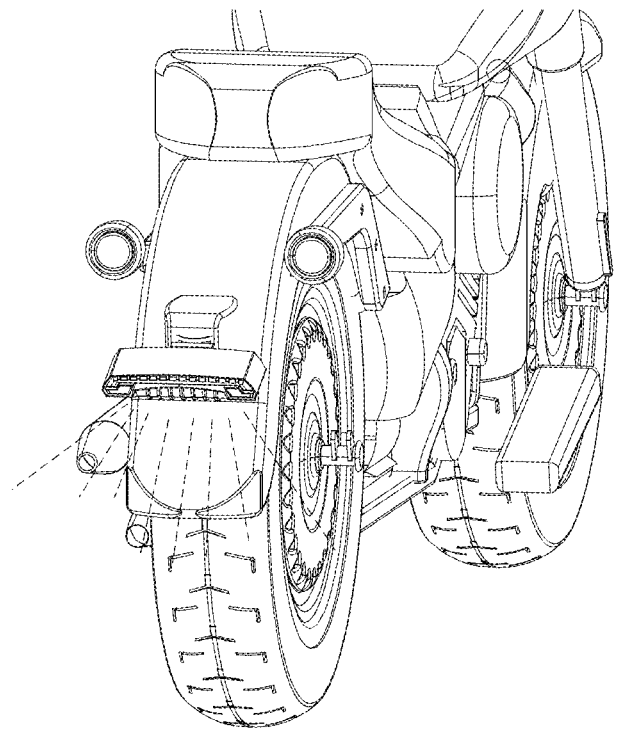
FIG. 14 shows a non-limiting example motorcycle lighting system, in which a light source is activated in response to a change in sound level.

In an example embodiment, once the motor sound of the motorcycle 903 reaches a certain level, a change in sound level is detected by the sound level sensor enclosed in the portable electronic device. In particular, FIG. 13 shows an example motorcycle lighting system, in which a change in sound level is detected by a sound level sensor of a smartphone affixed to a handle bar of the motorcycle. For example, the screen of the smartphone may turn red and blink in response to the detected rev-up sound. After that, a corresponding signal or command will be generated and then sent to the light unit 902 via a wired or wireless connection. As a result, a light source of the light unit 902 starts to blink and constantly blinks for a period of time, thereby enhancing the visibility of the motorcycle. For example, FIG. 14 shows an example motorcycle lighting system, in which a rear light is blinking in response to a detected change in sound level. Increased motorcycle visibility in critical times can be an important factor in reducing accidents and saving lives.

Figure 11:
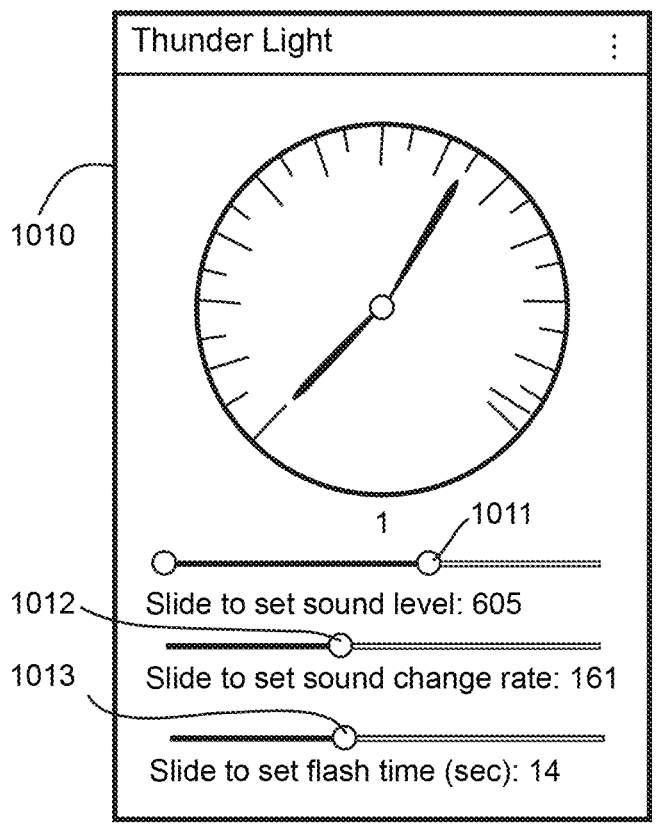
FIG. 11 shows an example screen displayed by a software application on a portable electronic device allowing a user to configure a motorcycle lighting system.

A motorcycle rider may configure the motorcycle lighting system 900 via the software application on the portable electronic device 901 as desired. For example, as shown in FIG. 11, the software application on the portable electronic device 901 displays a screen 1010 enabling the rider to adjust a threshold sound level, a sound change rate and a blinking time period for a light source.

A motorcycle rider may adjust a threshold sound level that triggers the blinking of a light source. Riders can adjust the threshold sound level via a slider 1011 on the screen 1010 in order to adjust the motorcycle lighting system in accordance with different types of sounds and different sounds levels due to different motorcycle characteristics, such as different exhausts, different brands or different models. As a result, the configurable lighting system may be customized to fit any motorcycle brands or models. The sound change rate is also adjustable via a slider 1012 on the screen 1010. The software application checks for changes in sound level, and only if a specific increase or decrease of sound occurs, the light will blink. This feature ensures that there is no constant blinking at an on-going high noise level, for example, at high speed cruising.

The blinking time period of a light source of the light unit 902 is preset and also adjustable by users. As some state laws prohibit constantly blinking light for a period longer than a permitted period, the blinking time period may be adjusted via a slider 1013 to accommodate compliance with existing or even future laws and regulations.

Figure 12:
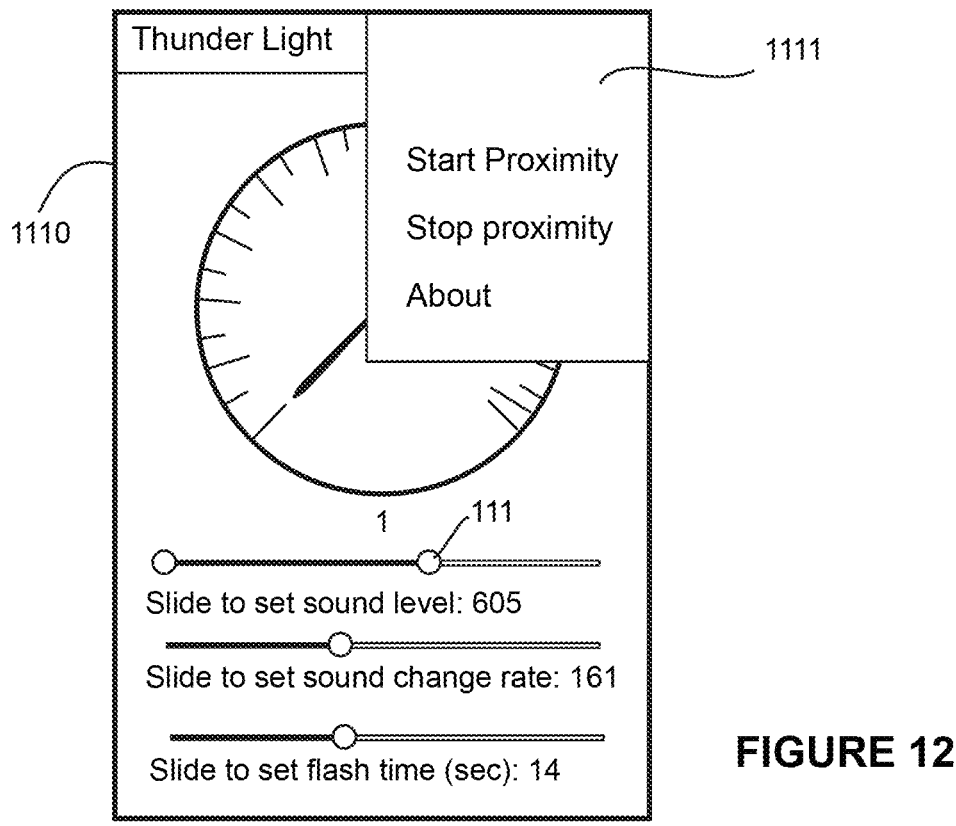
FIG. 12 shows an example screen displayed by a software application on a portable electronic device allowing a user to configure a motorcycle lighting system.

For certain times and places, certain changes in sound level may not be allowed, so there are alternative ways to trigger a light unit associated with a vehicle. In an example embodiment, a rider may place his/her hand above a portable electronic device in a close proximity (gloved or ungloved), with or without any contact with the device. A proximity sensor enclosed in the portable electronic device senses the proximity of the rider's hand, and then a signal or command is sent to the light unit to activate a light source for a given time period. As shown in FIG. 12, a software application on a portable electronic device may display a screen 1110 to allow a rider, via menu items 1111 on the screen 1110, to start or stop triggering the light unit in response to data sensed by a proximity sensor.

Motorcycle riders may have already revved the motor at times/places when they are concerned with low visibility. In these cases, the light units associated with the motorcycles may have already been activated automatically in response to signals or commands generated based on data from motion sensors.

This motorcycle lighting system 900 may also allow riders to control remotely other functions of a motorcycle such as ambiance lights.

In some example embodiments, a software application may be installed and executed on the portable electronic device 901 to allow users to review data sensed by sensors, to monitor the status of the motorcycle 903 or the light unit 902, or to configure the parameters of the motorcycle lighting system 900, for example, as shown in FIGS. 15-18. For example, the software application may display the lighting status of various light elements of the light unit 902 (e.g., as shown in FIGS. 15 and 18), the speed of the motorcycle 903 (e.g., as shown in FIG. 16), and the current time on the portable electronic device 901 (e.g., as shown in FIG. 16). The software application may also provide user interfaces to allow manual setups for a solid or flashing light, turn signals. Laser lights, etc. As shown in FIG. 17, in an example embodiment, the software application on the portable electronic device 301 allows a user to configure: Brightness control, Toggle App control. Voice control, Turns control, Approaching cars, and minimize, etc.

Certain functionalities of a lighting system for a bicycle or motorcycle are described in the above example embodiments. It is understood that other functionalities may also be provided by a lighting system through leveraging one or more sensor(s) of a portable electronic device. Future upgrades to a lighting system can include other functionalities that rely on new sensors provided by a portable electronic device, such as sensors detecting proximity to light and intersections, or sensors detecting changes in weather, etc. Importantly, additional new features may be automatically upgraded, e.g., via cloud, to existing users of an intelligent light system. Therefore, functionalities of an intelligent light system can keep on getting enhanced or upgraded for its existing users.

In some example embodiments, via a motion sensor enclosed in a portable electronic device, an intelligent light may be automatically turned off when a vehicle stops and be automatically turned on when the vehicle starts to move, thereby reducing the power consumption for the light.

In certain example embodiments, a light unit may also include an intelligent light source that generates turning signals, in accordance with direction changes of a part of a vehicle (e.g., a handle bar) detected by a gyroscope enclosed in a portable electronic device.

In alternative example embodiments, an intelligent light unit may be controlled by user voice commands. For example, when a vehicle rider says "right," "left," "brake," or "stop," a corresponding light unit may change its operation in response to commands generated by a voice sensor and/or a voice recognition system enclosed in a portable electronic device.

Figure 19:
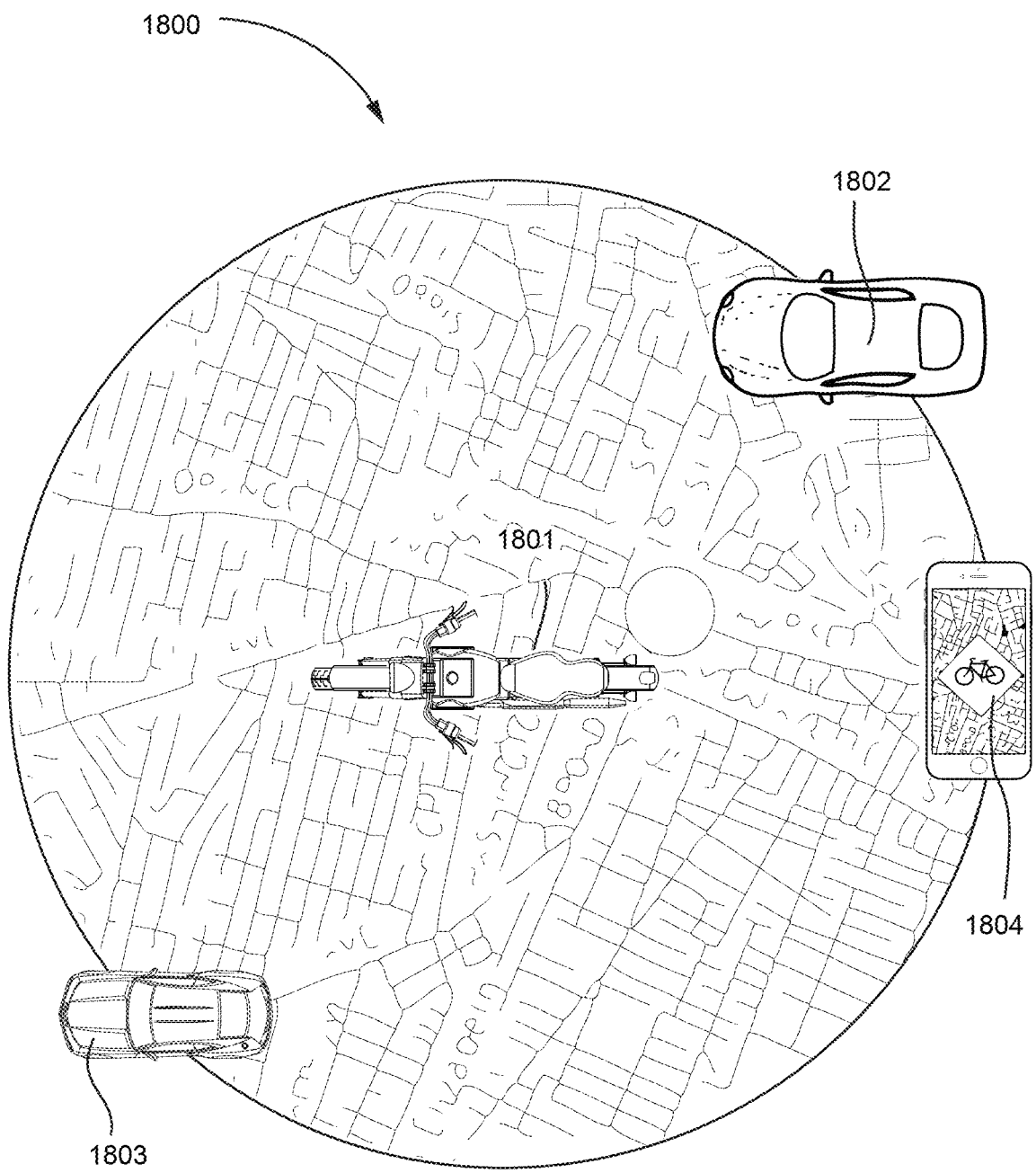
FIG. 19 illustrates a non-limiting example Early Bicycle Collision Avoidance System (eBCAS).

Referring now to FIG. 19, the figure illustrates a non-limiting example Early Bicycle Collision Avoidance System (eBCAS) 1800. The Early Bicycle Collision Avoidance System (eBCAS) 1800 increases visibility of bicycle or motorcycle riders for nearby cars to avoid accidents.

In certain example embodiments, the eBCAS 1800 comprises a bicycle or a motorcycle 1801, one or more cars 1802, 1803. The bicycle or motorcycle 1801 is equipped with an electronic emitting device to emit a beacon. In an example embodiment, the emitted beacon includes the "Name" of the device and/or the text "eBCAS." Electronic beacons of various contents may be emitted based on different protocols. In some example embodiments, the "Name" or identity of the device, similar to a SSID for Wi-Fi technology or a UUID for Bluetooth technology, may always be required.

The electronic beacon may be emitted by the electronic emitting device associated with the bicycle or motorcycle 1801 via Bluetooth technology and/or Wi-Fi technology. By virtue of the electronic beacon, the bicycle or motorcycle 1801 is detectable even if it is out of sight, for example, in fog, traffic, blind spots, or around the corner, etc.

In some example embodiments, the electronic emitting device can be part of a lighting system of a bicycle or a motorcycle. The electronic emitting device can be a dedicated small transmitter with its own battery. Alternatively, the electronic emitting device can be a portable electronic device, such as a smartphone or PAD, with an application that runs in the background and transmits its beacons via Bluetooth or Wi-Fi, or both.

The cars 1802, 1803 are equipped with a simple electronic detector to spot these emitted beacons from a distance, such as from 300 feet to 5000 feet. In certain example embodiments, the electronic detector may be enclosed in a portable electronic device, such as a smart phone, a PAD or a GPS, etc., as well. The cars 1802, 1803 may simply use an application executing on the portable electronic device to detect the beacons emitted by the bicycle or motorcycle 1801 by using the electronic detector enclosed in the portable electronic device. This application uses wireless technologies, such as Wi-Fi and Bluetooth, to scan for a particular information, for example, an advertised name "eBCAS." Whenever that particular information emitted from a bicycle or motorcycle is detected, which means that a bicycle or motorcycle is nearby, an alert will appear, visually and acoustically. For example, as shown in FIG. 19, a particular icon 1804 may be displayed on a portable electronic device attached to the car. The driver can then slow down and watch for the nearby bicycle.

In other example embodiments, an electronic detector and an application used to detect emitted beacons (e.g., "eBCAS") and display an alert to the drivers may be directly built into a car, such as being built into a car navigation and connection system. For example. Google's Android Auto & Apple's CarPlay could have a built-in APP to cover these features. The alert can then be displayed on a car's navigation screen for better visibility. In another example embodiment, car manufacturers may also offer a built-in APP that is included in the car system. The App will run in the background and an alert regarding a nearby vehicle will be displayed on the front window or a car navigation screen.

Certain example lighting systems for bicycles, or motorcycles are described above. However, it is understood that an intelligent lighting system may also be used for other kinds of vehicles or things, including but not limited to a scooter, a baby stroller walker, a wheel chair, a boat trailer and camper, a cane, a pole, or the like.

While the invention has been described in connection with vehicles, it is to be understood that the invention is not to be limited to vehicles. The invention may also be used to smart house components, such as one or more sensor(s) of a portable electronic device may be used to create automatic behaviors in a house, without placing external sensors. Generally, any accessory, which can benefit from information about changes in environments, can be leverage the sensors enclosed in a portable electronic device in accordance with the disclosure herein.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A lighting system for a vehicle comprising a portable electronic device and a lighting accessory, the portable electronic device including:
    a transmitter configured to support a short-range wireless communication mechanism;
    one or more sensors configured to sense parameters of the vehicle and surrounding environment; and
    a processing system including at least one processor, the processing system being configured to at least:
        determine whether a predetermined condition change of the vehicle and surrounding environment is detected by the one or more sensors,
        in response to the detection of the predetermined condition change, generate a signal controlling the lighting accessory to modify illumination, and
        transmit the generated signal to the lighting accessory via the short-range wireless communication mechanism supported by the transmitter, and
    the lighting accessory including:
        a receiver configured to support the short-range wireless communication mechanism;
        one or more lighting elements; and
        one or more processors, the one or more processors being configured to at least:
            receive the generated signal from the portable electronic device via the short-range wireless communication mechanism supported by the receiver, and
            modify illumination of at least one of the one or more lighting elements according to the received signal,
    wherein the lighting accessory is attachable to a vehicle or a rider,
    wherein the predetermined condition change includes decelerating, braking, accelerating, turning, or proximity to another object of the vehicle.

2. The lighting system according to claim 1, wherein the one or more lighting elements of the lighting accessory include a main light, a braking light, a laser light, a left turning light, and/or a right turning light.

3. The lighting system according to claim 2, wherein the main light includes a red light, and the left turning light and the right turning light include a yellow light.

4. The lighting system according to claim 1, wherein the predetermined condition change of the surrounding environment includes a change in sound level, light level, temperature, proximity to another object, location, and/or gravity of the surrounding environment.

5. The lighting system according to claim 1, wherein the modifying illumination includes blinking at least one of the one or more lighting elements, making a sound, and/or raising an alarm, for a predetermined time period.

6. The lighting system according to claim 1, wherein the modifying illumination includes turning off, turning on, and/or flashing the at least one of the one or more lighting elements.

7. The lighting system according to claim 1, wherein the signal from the portable electronic device is received by the lighting accessory via Internet, Bluetooth, Wi-Fi, cellular, or NFC.

8. The lighting system according to claim 1, wherein the one or more lighting elements include a laser light configured to emit one or more laser lights to mark the road in close proximity to the vehicle.

9. The lighting system according to claim 1, wherein the processing system of the portable electronic device is further configured to display a user interface to enable a user to configure the modification of the illumination.

10. The lighting system according to claim 1, wherein the processing system of the portable electronic device is further configured to display a user interface enabling a user to review or change a status or mode of at least one of the one or more lighting elements.

11. A method of leveraging sensors of a portable electronic device to enhance the functionality of a lighting accessory including one or more lighting elements, the method comprising:
- detecting condition changes of a vehicle and surrounding environment by one or more sensors of the electronic device;
- determining whether a predetermined condition change of the vehicle and surrounding environment is detected;
- in response to the detection of the predetermined condition change, generating a signal controlling the lighting accessory to modify illumination of one or more lighting elements; and
- transmitting the generated signal to the lighting accessory via a short-range wireless communication mechanism,
- wherein the lighting accessory is attached to a vehicle or a rider,
- wherein the predetermined condition change includes decelerating, braking, accelerating, turning, or proximity to another object of the vehicle.

12. The method according to claim 11, wherein the predetermined condition change of the surrounding environment includes a change in sound level, light level, temperature, proximity to another object, location, and/or gravity of the surrounding environment.

13. The method according to claim 11, wherein the modifying illumination comprises blinking at least one of the one or more lighting elements, making a sound, and/or raising an alarm, for a predetermined time period.

14. The method according to claim 11, wherein the modifying illumination comprises turning off, turning on, and/or flashing at least one of the one or more lighting elements.

15. The method according to claim 11, further comprising displaying a user interface to enable a user to configure the modification of the illumination.

16. The method according to claim 11, further comprising displaying a user interface enabling a user to review or change a status or mode of at least one of the one or more lighting elements.

17. A non-transitory computer-readable storage medium, having computer-executable instructions embodied thereon, wherein, upon executed by one or more processors of an electronic device, the computer-executable instructions cause the one or more processors to:
- detect condition changes of a vehicle and surrounding environment by one or more sensors of the electronic device;
- determine whether a predetermined condition change of the vehicle and surrounding environment is detected;
- in response to the detection of the predetermined condition change, generate a signal controlling a lighting accessory to modify illumination of one or more lighting elements; and
- transmit the generated signal to the lighting accessory via a short-range wireless communication mechanism,
- wherein the lighting accessory is attached to a vehicle or a rider,
- wherein the predetermined condition change includes decelerating, braking, accelerating, turning, or proximity to another object of the vehicle.

18. The non-transitory computer-readable storage medium according to claim 17, the computer-executable instructions further cause the one or more processors to display a user interface to enable a user to configure the modification of the illumination.

19. The non-transitory computer-readable storage medium according to claim 17, the computer-executable instructions further cause the one or more processors to display a user interface enabling a user to review or change a status or mode of at least one of the one or more lighting elements.

* * * * *